United States Patent [19]

Watanabe et al.

[11] 4,275,168

[45] Jun. 23, 1981

[54] POLYOLEFIN RESIN FOAM AND PROCESS FOR CONTINUOUSLY MANUFACTURING THE SAME

[75] Inventors: Seizaburo Watanabe; Yutaka Matsuki, both of Suzuka, Japan

[73] Assignee: Asahi-Dow Limited, Tokyo, Japan

[21] Appl. No.: 62,454

[22] Filed: Jul. 30, 1979

[51] Int. Cl.$^3$ .............................................. C08J 9/14
[52] U.S. Cl. ............................... 521/82; 264/DIG. 5; 521/79; 521/91; 521/94; 521/143; 521/144; 521/149
[58] Field of Search ................... 521/94, 79, 143, 144

[56] References Cited

U.S. PATENT DOCUMENTS

| | | | |
|---|---|---|---|
| 2,572,568 | 10/1951 | Gluesenkamp | 521/94 |
| 2,928,130 | 3/1960 | Gray | 521/79 |
| 2,956,960 | 10/1960 | Nemphos | 521/94 |
| 3,227,664 | 1/1966 | Blades et al. | 521/79 |
| 3,634,564 | 1/1972 | Okamoto et al. | 521/79 |
| 3,658,973 | 4/1972 | Aykanian | 521/79 |
| 3,808,300 | 4/1974 | Miyamoto et al. | 521/79 |

*Primary Examiner*—Morton Foelak

[57] ABSTRACT

The invention relates to a foaming on foamable olefin polymer composition containing a nucleating agent and a cell size increasing agent comprising certain amino acids and/or polyhydric alcohols.

10 Claims, No Drawings

POLYOLEFIN RESIN FOAM AND PROCESS FOR CONTINUOUSLY MANUFACTURING THE SAME

This invention is concerned with improvements in or relating to a highly expanded foam of a polyolefin resin and a process for continuous expansion molding of polyolefin resins. Highly expanded foams of polyolefin resins are widely exployed as cushioning materials making use of their good recovery properties upon compression, heat-insulating and floating materials taking advantage of their closed cells, and the like for different industrial uses. Hitherto, it has been difficult to continuously prepare highly expanded polyolefin foams with good molding properties, in which a specific blowing agent difficult to dissolve in the polyolefin resin and a nucleatinhg agent having a melting point higher than that of the resin, such as a finely-powdered inorganic substance, are allowed to be present in amounts sufficient to foam stable cells having a cell size larger than a predetermined size. In the continuous expansion molding of a polyolefin resin, according to the prior art, the formation of cells having a cell size of 0.1 mm or less generally resulted in the collapse of closed cells. Thus it was difficult to apply the continuous expansion molding. Use of a specific blowing agent less soluble in a polyolefin resin (e.g., 1-chloro-1,1'-difluoroethane, etc.) permitted ready expansion of the polyolefin resin, still it was difficult to foam a highly expanded foam by continuous expansion molding. This is because the blowing agent has an effect of reducing the cell size, which varies more or less depending upon the crystallization and gas-dissolving property of the base resin. Furthermore, use was made of a finely-powdered compound which serves to diminish the cell size and which has a melting point higher than that of the resin, for instance, high-melting compounds such as pigments, light stabilizers, flame retardants, heat stabilizers etc. Addition of such a compound in sufficient amounts to attain the desired purpose causes the cell size to diminish excessively, thus rendering it difficult to carry out continuous expansion molding in a stable state.

This invention provides a highly expanded foam by continuously manufacturing a highly expanded foam of a polyolefin resin with good expansion moldability, the cells of which are rich in closed cells, and which foam has a density of less than 100 kg/m$^3$ and an average cell size of 0.1 mm up to 10 mm in a uniform and stable state, in the presence of substances serving to diminish the average cell size. Accordingly, this invention provides a polyolefin resin foam containing a finely-powdered compound having a melting point higher than that of the resin, which is characterized by having an average cell size of 0.1 mm or more and a structure rich in uniform closed cells.

The foam of this invention is prepared by a process for manufacturing a polyolefin resin foam comprising the addition of a blowing agent and a finely-powdered compound having a melting point higher than that of the resin by kneading the resin and the expansion of the resultant mixture, characterized by heating, kneading and expanding a polyolefin resin containing 0.05-10 percent by weight of at least one of amino acids having the formula:

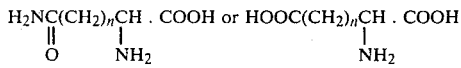

wherein n is an integer of 1 to 8 and/or polyhydric alcohols having the formula: HOCH$_2$(CHOH)$_n$CH$_2$OH wherein n is an integer of 2 to 10 and 5-60 percent by weight of a blowing agent having an atmospheric boiling point below the melting point of the resin and a KB value of 60-5 by ASTM-D-1133-61.

The characteristic feature of this invention resides in that use is made of a specific blowing agent (i.e., a volatile blowing agent having a KB value of 60 to 5 by ASTM-D-1133-61) and specific additives. According to this invention, it has surprisingly been found that uniform and stable polyolefin resin foams having a high closed cell content are continuously prepared merely by using a specific blowing agent having an effect of diminishing the cell size, since its gas is difficult to dissolve in the resin, and by adding to the resin a small amount of an additive capable of increasing the cell size (hereinafter referred to as the cell size-increasing agent) even in the presence of a nucleating agent having an effect of diminishing the cell size further.

The process of this invention places no limitation on the expanding method. It is applicable to both noncrosslinked and cross-linked resins. In view of productivity, particular preference is given to a continuous extrusion expansion process in which a cross linkage-free polyolefin resin is used as the base resin, since it can make the best use of the advantages of this invention.

The specific blowing agent referred to in this invention is a requisite for obtaining a highly expanded polyolefin resin foam having a density of 100 kg/m$^3$ or less, critically up to 10 kg/m$^3$. More specifically, use is made of a volatile blowing agent having an atmospheric boiling point lower than the melting point of the resin and a kauri-butanol value (hereinafter simply described as a KB value) ranging from 60 to 5 which is a measure of the solubility of the resin and blowing agent and is determined by ASTM-D-1133-61. Representatives of such a blowing agent are dichlorodifluoromethane having a KB value of 18, 1,2-dichlorotetrafluoroethane having a KB value of 12, 1,1',2-trichlorotrifluoroethane having a KB value of 32, propane having a KB value of 23, butane having a KG value of 24, trichlorofluoroemthane having a KB value of 60, chlorodifluoromethane having a KB value of 25, 1-monochloro-1,1'-difluoroethane having a KB value if 20, 1-chloro-1,1'-difluoroethane having a KB value of 11 and many others. A blowing agent of a KB value exceeding 60 may be mixed with a blowing agent having a KB value of less than 60 to form a mixture having a KB value of 60 to 5 for use. At a KB value exceeding 60, the blowing agent undergoes a considerable contraction during high expansion, resulting in unfavorable moldability, and at a KB value less than 5, it is difficult to maintain closed cells. In this invention, any chemical blowing agent undergoing decomposition to liberate nitrogen and other gases therefrom cannot be used. The amount of the blowing agent used is preferably 5 to 60% by weight, with respect to the base resin. At less than 5% by weight, it is difficult to obtain a foam having a density of less than 100 kg/m$^3$, and at more than 60% by weight, the moldability of a foam is reduced.

The finely-powdered compound (hereinafter simply called the nucleating agent) referred to in this invention is a compound having a melting point higher than that of the base resin and a particle size of 0.1 mm or less after it has been mixed with and dispersed in the base resin with the application of heat and is a requisite for making the distribution of cells in the foam uniform. Representatives of such a compound are, for example, talc, carbon black, pigments, heat stabilizers having a high melting point, flame retardants and light stabilizers. A compound in which the particle size assumes a value exceeding 0.1 mm in the foam lowers the rate of closed cells with respect to cells and is therefore not preferred. The amount of the nucleating agent having an effect on the uniformization of cells, at which this invention aims, without adversely affecting the stability of cells, ranges from 0.01 to 10% by weight.

Representatives of the amino acids which are best suited for this invention and cause an increase in the average cell size include, for example, L-asparagine, L-aspartic acid, L-glutamine, L-glutamic acid etc., and the polyvalent alcohols used include hexahydroxyhexane etc. Mixtures of them may advantageously be used. The amount of the cell size-increasing agent which is suitable for the object of this invention and causes no deterioration with respect to the expansion moldability is in a range of 0.05 to 10% by weight.

The polyolefin resin referred to in this invention is a polyolefin resin of which the melt index is 0.1 to 30 g/10 min. measured by ASTM-D-1238-58. With a resin having a melt index of less than 0.1 g/10 min. or more than 30 g/10 min., it is substantially impossible to attain the object of this invention. Typical examples of the polyolefin resin used in this invention include low-density polyethylene, medium/high-density polyethylene, polypropylene, ethylene/vinyl acetate copolymers, ethylene/acrylic acid copolymers, ionomers etc., and mixtures thereof.

The term "ionomer" as used in this description and claims means an ethylenic copolymer cross-linked with a metal ion. They are produced by any of the methods disclosed in Japanese Patent Publications No. 6810/1964, and No. 31556/1974 and to Japanese Laying-open No. 8885/1975, for example.

Typical compositions of ionomer may be represented by the following generic formula:

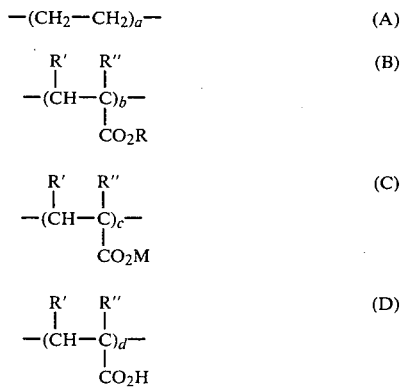

wherein:

(A) is an ethylene monomer unit.

(B) is a monomer unit of an ester of an unsaturated carboxylic acid suitably containing four to ten carbon atoms.

(C) is a monomer unit of a metal salt of an unsaturated carboxylic acid suitably containing three to nine carbon atoms.

(D) is a monomer unit of an unsaturated carboxylic acid suitably containing three to nine carbon atoms.

In the formula, R is a lower alkyl group such as methyl, ethyl or propyl, M is Na, Ca, Zn or another similar metal, R' and R'' are each a hydrogen atom or methyl group, and a, b, c and d each indicate the mol percentage of the relevant monomer unit present in the copolymer. Preferably, is a 50–97 mol % and b is 0–30 mol %, otherwise uniform foam is hardly produced after extrusion. M, a, b, c and d values are easily observed by an infrared spectro-photomer.

The neutrality of an ionomer, N, is defined as follows:

$$N \text{ (mol \%)} \pm c/(c+d) \times 100.$$

The degree of saponification, S, is defined by the following equation:

$$S \text{ (mol \%)} = (c+d)/(b+c+d) \times 100.$$

When the N value is not more than 100%, there are improved adhesive properties on the surface of the foam. This may be because of the carboxylic acid group present in the ionomer. For the products of this invention, best results are realized when the N value of the ionomer is up to 50%, preferably up to 10%.

The saponification value S of the ionomers utilizable in this invention will be at least 50%, and preferably at least 70%. The value of S may be 100%, when b value is zero.

In this invention, compounds having a melting point lower than that of the base resin, such as lubricants, heat stabilizers, anti-ultraviolet degradation agents, flame retardants etc. may be used in amounts of 10 to 0.02% by weight.

This invention is further illustrated by the following examples.

EXAMPLE 1

100 parts by weight of low-density polyethylene having a melt index of 3.0 (F-2130 manufactured by Asahi-Dow Limited), 0.5 parts by weight of talc having an average particle size of 0.03 mm, 2.5 parts by weight of carbon black, having an average particle size of 0.02 mm (for weather proofing) and 4 parts by weight of hexahydroxyhexane were mixed together. The resultant mixture was introduced into an extruder having a barrel inside diameter of 30 mm heated to 180° C., where it was mixed with 21 parts by weight of 1-chloro-1,1'-difluoroethane injected from an inlet provided at the end of the extruder. The thus heated mixture was cooled to 102° C. in a cooler connected with the extruder, and was continuously extruded through a die of 5 mm diameter into the atmosphere for expansion. As as result, foams having closed cells were continuously obtained in a stable state with good moldability. The obtained foam had a density of 33 kg/m$^3$, an average cell size of 0.7 mm and uniform cells.

COMPARATIVE EXAMPLE 1

Example 1 was repeated, but no hexahydroxyhexane was added. As a result, cell collapse took place to such an extent that the continuous expansion moldability was put in an extremely unstable state. The obtained foam was extremely uneven having an average cell size of about 0.02 mm with the density varying largely in a range of about 38 to about 52 kg/m³.

EXAMPLE 2

Example 1 was repeated, but an ethylene/vinyl acetate copolymer having a melt index of 3.0 and a vinyl acetate content of 25% by weight (Evatate K-201 manufactured by Sumitomo Kagaku K.K.), L-glutamic acid and 1,2-dichlorotetrafluoroethane were used in place of the low-density polyethylene, hexahydroxyhexane and 1-chloro-1,1'-difluoroethane, respectively, and the temperature of the mixed resin just in front of the die was adjusted to 78° C. The resultant foam having closed cells underwent no contraction, and the continuous expansion moldability was put in a stable state. The foam was found to have a density of 31 kg/m³ with uniform cells having an average cell size of 0.5 mm, which is the arithmetic mean of the maximum diameters of all the cells included in the section area (1 cm³) of the foam.

COMPARATIVE EXAMPLE 2

Example 2 was repeated, but no L-glutamic acid was added. As a result, cell collapse took place to such an extent that the continuous expansion moldability was put in an extremely unstable state. The obtained foam had a density varying largely in a range of 47 to 63 kg/m³ and an extremely uneven average cell size of about 0.03 mm.

EXAMPLE 3

50 Parts by weight of high-density polyethylene having a melt index of 1.0 (Suntex S-360 manufactured by Asahi Kasei Kogyo K.K.), 50 parts by weight of an ionomer having a melt index of 1.0 (prepared on an experimental scale by Asahi-Dow Limited), 2.5 parts by weight of carbon black having an average particle size of 0.02 mm and 3 parts by weight of hexahydroxyhexane were mixed together. The resultant mixture was fed into an extruder having a barrel inside diameter of 30 mm and heated to 200° C., where it was heated and kneaded with 23 parts by weight of dichlorodifluoromethane injected from an inlet provided at the end of the extruder. The thus heated mixture was cooled to 123° C. in a cooler connected with the extruder, and was continuously extruded through a die of 5 mm diameter in the atmosphere for expansion. The obtained foam had a density of 21 kg/cm³ with uniform cells and an average cell size of 0.6 mm. Foams having closed cells were continuously obtained with good moldability in a stable state.

COMPARATIVE EXAMPLE 3

Example 3 was repeated, but no hexahydroxyhexane was added. As a result, cell collapse took place to such an extent that collapsed foams were intermittently obtained with bad moldability in an unstable state. The density of the obtained foam showed great variations and amounted to about 41 kg/m³. The average cell size was of about 0.01 mm and extremely uneven.

COMPARATIVE EXAMPLE 4

Example 1 was repeated, but methyl chloride having a KB value of 80 was used in place of 1,2-dichlorotetrafluoroethane having a KB value of 12. As a result, the obtained foam had closed cells, but showed unfavorable moldability due to the occurrence of a vigorous contraction. The foam had a density of 64 kg/m³ with uneven cells having an average cell size of about 2.0 mm.

As will be found from the foregoing examples and comparative examples, this invention provides a process which can efficiently produce a polyolefin resin foam by adding a high-melting compound in an amount sufficient to attain the desired purpose without adversely affecting the continuous expansion moldability on an industrial scale.

The embodiments of the invention in which an exclusive property or privilege is claimed are defined as follows:

1. Aliphatic olefin polymer foam
(A) containing
   (1) a nucleating agent having a melting point higher than that of the olefin polymer and having a particle size of 0.1 mm or less and
   (2) from 0.05 to 10 percent by weight of at least one cell size-increasing agent, said amount of said agent being sufficient to measurably increase cell size of the resultant foam product relative to the cell size of the foam produced not containing said agent, said cell size-increasing agent being selected from the group consisting of
   (a) amino acids having the formula:

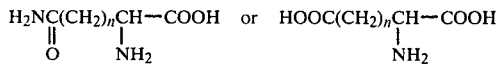

wherein n is an integer of 1 to 8 or
   (b) polyhydric alcohols having the formula: HOCH$_2$(COH)$_n$CH$_2$OH wherein n is an integer of 2 to 10;
(B) having a density of 100 kilograms per cubic meter or less and a structure rich in uniform closed cells having an average cell size of from 0.1 mm up to 10 mm; and
(C) wherein said olefin polymer has a melt index of 0.1 to 30 gm/10 min. as measured by ASTM-D-1238-58.

2. An olefin polymer resin foam as claimed in claim 1 in which the olefin polymer is polyethylene, polypropylene, an ethylene/vinyl acetate copolymer, an ethylene/propylene copolymer, an ethylene/acrylic acid copolymer, an ionomer or a mixture thereof.

3. An olefin polymer foam as claimed in claim 1 or 2, in which the nucleating agent is talc, carbon black, a pigment, heat stabilizer, flame retardant, light stabilizer or a mixture thereof.

4. A continuous process for manufacturing an olefin polymer resin foam, characterized by heating, kneading and expanding an olefin polymer resin containing (1) a nucleating agent having a melting point higher than that of the polyolefin resin; (2) from 0.05–10 percent by weight, with respect to the polyolefin resin, of at least one cell size-increasing agent selected from the group consisting of (a) amino acids having the formula:

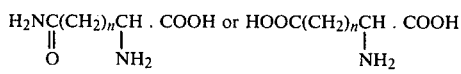

wherein n is an integer of 1 to 8, and (b) polyhydric alcohols having the formula: HOCH$_2$(CHOH)$_n$CH$_2$OH wherein n is an integer of 2 to 10; and (3) from 5–60 percent by weight, with respect to the polyolefin resin, of a blowing agent having an atmospheric boiling point below the melting point of the resin and a KB value of 60-5 as measured by ASTM-D-1133-61; said process being further characterized by providing the resultant polyolefin foam product with an increased average cell size relative to that obtained in the absence of said cell size-increasing agent.

5. A process as claimed in claim 4, in which the olefin polymers is polyethylene, polypropylene, an ethylene/vinyl acetate copolymer, an ethylene/propylene copolymer, an ethylene/acrylic acid copolymer, an ionomer or a mixture thereof.

6. A process as claimed in claim 5, in which the olefin polymer has a melt index of 0.1 to 30 g/10 min. as measured by ASTM-D-1238-58.

7. A process as claimed in any one of claims 4 to 6, in which the nucleating agent is talc, carbon black, a pigment, heat stabilizer, flame retardant, light stabilizers or a mixture thereof.

8. A process as claimed in claim 7 in which the nucleating agent is added in amounts of 0.01 to 10 percent by weight with respect to the olefin polymer.

9. A process as claimed in any one of claims 4 to 6, in which the cell size-increasing agent is L-aspargine, L-aspartic acid, L-glutamine or L-glutamic acid.

10. A process as claimed in claims 4 to 6, in which the cell size-increasing agent is hexahydroxyhexane.

* * * * *

UNITED STATES PATENT AND TRADEMARK OFFICE
CERTIFICATE OF CORRECTION

PATENT NO. : 4,275,168
DATED : June 23, 1981
INVENTOR(S) : Seizaburo Watanabe and Yutaka Matsuki It is certified that error appears in the above—identified patent and that said Letters Patent is hereby corrected as shown below:

Col. 2, lines 6 and 8, please insert -- , -- after "1 to 8" on line 6 and "2 to 10" on line 8, respectively;

Col. 2, line 50, please change "if" to -- of --;

Col. 4, line 11, "is a" should read -- a is --;

Col. 4, line 16, "N(mol %)$\pm$c/(c+d)x100" should read -- N(mol %)=c/(c+d)x100 --;

Col. 6, Claims 2 and 4, please delete the word "resin" from lines 40, 51 and 52 in each instance.

Col. 6, Claim 4, lines 53, 54 and 65, please change "polyolefin resin" to -- olefin polymer --.

Signed and Sealed this

Fifteenth Day of December 1981

[SEAL]

Attest:

GERALD J. MOSSINGHOFF

Attesting Officer

Commissioner of Patents and Trademarks